United States Patent
Miller et al.

(10) Patent No.: US 6,865,964 B2
(45) Date of Patent: Mar. 15, 2005

(54) TRANSMISSION MAIN SHAFT CENTERING DEVICE

(75) Inventors: Lon C. Miller, Grand Junction, MI (US); Alan R. Davis, Plainwell, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/319,338

(22) Filed: Dec. 12, 2002

(65) Prior Publication Data

US 2004/0112157 A1 Jun. 17, 2004

(51) Int. Cl.[7] .............................................. F16H 3/08
(52) U.S. Cl. ........................................ 74/329; 384/225
(58) Field of Search .................. 74/329, 331; 384/225, 384/228, 246, 425

(56) References Cited

U.S. PATENT DOCUMENTS

| | | | | |
|---|---|---|---|---|
| 3,012,828 A | * | 12/1961 | Matthey | 384/225 |
| 3,036,871 A | * | 5/1962 | Matthey | 384/225 |
| 3,105,395 A | | 10/1963 | Perkins | |
| 3,255,644 A | | 6/1966 | Warren et al. | |
| 3,283,613 A | | 11/1966 | Perkins | |
| 3,335,616 A | | 8/1967 | Perkins | |
| 3,349,635 A | | 10/1967 | Richards | |
| 3,378,214 A | | 4/1968 | Hilsinger, Jr. | |
| 3,500,695 A | | 3/1970 | Keiser | |
| 3,648,546 A | * | 3/1972 | McNamara et al. | 74/745 |
| 4,267,741 A | * | 5/1981 | Jarl et al. | 74/339 |
| 4,452,540 A | * | 6/1984 | Rivoir | 384/99 |
| 4,483,210 A | * | 11/1984 | Mayuzumi | 74/360 |
| 4,901,600 A | * | 2/1990 | Wilson | 74/745 |
| 5,169,245 A | * | 12/1992 | Harada et al. | 384/610 |
| 6,672,180 B2 | * | 1/2004 | Forsyth | 74/339 |

* cited by examiner

*Primary Examiner*—Roger Pang
(74) *Attorney, Agent, or Firm*—Rader, Fishman & Grauer PLLC

(57) ABSTRACT

A transmission main shaft centering device is provided for use between a transmission input shaft and the main shaft. The centering device includes an axially moveable support member having an axis that is substantially coaxial with an axis of the input shaft. The support member is biased into engagement with one of the input shaft and the main shaft to maintain the main shaft substantially coaxial with the input shaft. The support member may include a first engaging component and one of the input shaft and the main shaft may include a second engaging component. The first and second engaging components mate to maintain the main shaft substantially coaxial with the input shaft.

3 Claims, 4 Drawing Sheets

TRANSMISSION MAIN SHAFT CENTERING DEVICE

BACKGROUND OF THE INVENTION

1. Field of the Invention

The present invention relates to multiple countershaft, change gear transmissions that include a main shaft, and in particular to multiple countershaft, change gear transmissions having a device for supporting the main shaft on-center when the transmission is in neutral.

2. Description of the Related Art

Change gear transmissions, that is, transmissions utilizing either simple or compound main shafts in connection with multiple countershafts, wherein the main shaft, the main shaft gears and/or the countershaft gears are mounted in a radially floating manner relative to the other gears, are well known in the prior art. Examples of such transmissions may be seen by reference to U.S. Pat. Nos. 3,105,395; 3,255,644; 3,283,613; 3,335,616; 3,349,635; 3,378,214; 3,500,695; and 3,648,546, all of which are hereby incorporated by reference. Transmissions of this type commonly include axially slidable clutches that are splined for rotation with the main shaft. These clutches are moved by a shifting mechanism, such as a rail or lever type shifting mechanism, to engage the main shaft for rotation with the main shaft gears.

An undesirable limitation of transmissions that include a radially floating main shaft is that the main shaft tends to fall off-center when the transmission is shifted to neutral and no torque is being transmitted through to the main shaft. Once off-center, greater effort is required by the shifting mechanism to move the axially slidable clutches and shift the transmission into gear.

SUMMARY OF THE INVENTION

A transmission main shaft centering device is provided for use between a transmission input shaft and a transmission main shaft. The centering device includes an axially moveable support member having an axis that is substantially coaxial with an axis of the input shaft. The support member is biased into engagement with one of the input shaft and the main shaft to maintain the main shaft substantially coaxial with the input shaft. The support member may include a first engaging component and one of the input shaft and the main shaft may include a second engaging component. The first and second engaging components mate to maintain the main shaft substantially coaxial with the input shaft.

The main shaft centering device of the present invention is particularly suited for, but not limited to, use with transmissions utilizing either simple or compound main shafts in connection with multiple countershafts, wherein the main shaft, the main shaft gears and/or the countershaft gears are mounted in a radially floating manner. The continuous engagement of the support member with either the main shaft or the input shaft prevents the main shaft from falling off-center when the transmission is in neutral.

Various additional aspects of this invention will become apparent to those skilled in the art from the following detailed description of the preferred embodiments, when read in light of the accompanying drawings.

DESCRIPTION OF THE PREFERRED EMBODIMENTS

Figure 1:
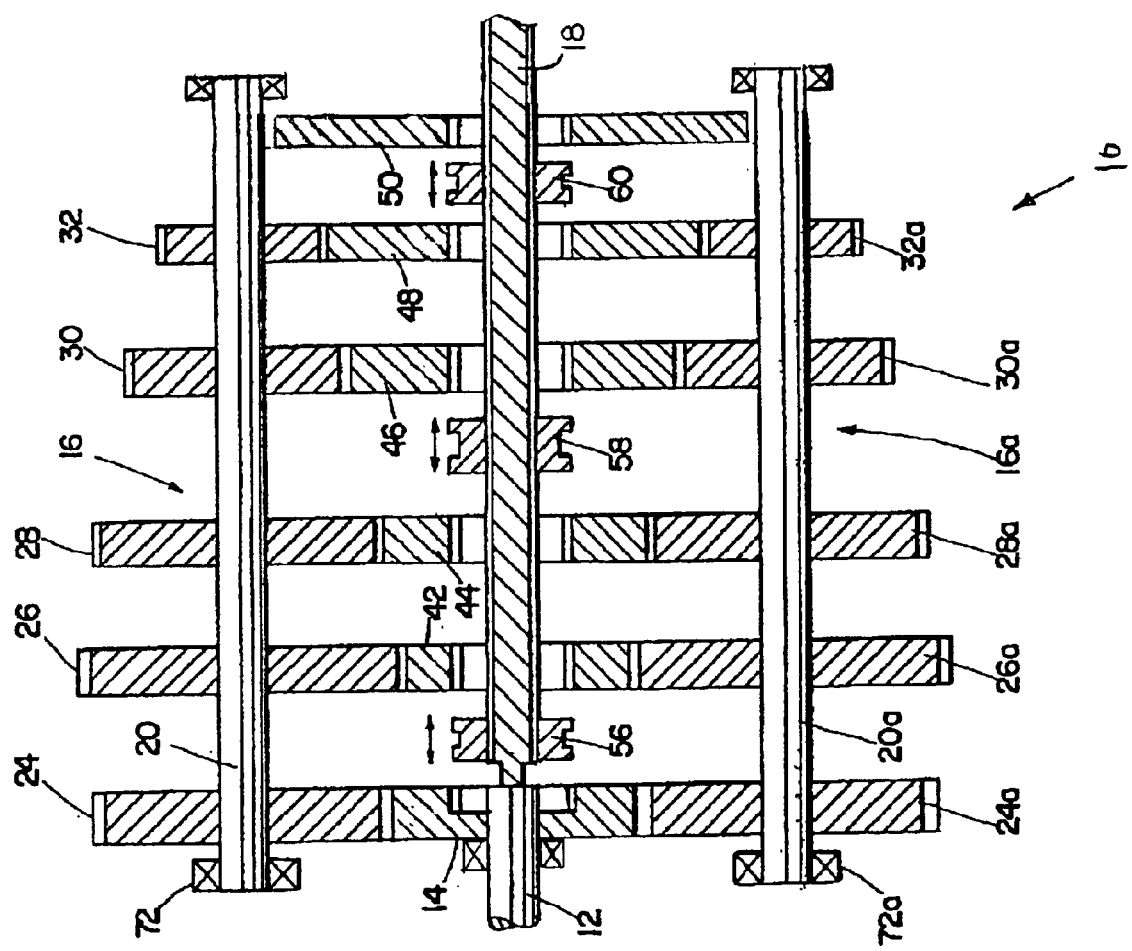
FIG. 1 is a simplified schematic illustration of an exemplary multiple countershaft transmission employing the main shaft centering device of the present invention.

Referring to FIG. 1, there is schematically illustrated an exemplary transmission 10 that is of the twin countershaft type, it being understood, however, that multiple countershaft transmissions having three, four or more countershafts may utilize the features of the present invention. Transmission 10 includes an input shaft 12 designed to be driven by the prime mover of a vehicle and a drive gear 14 carried thereon. Transmission 10 also includes a pair of substantially identical countershafts 16 and 16A and a main shaft 18. The axes of main shaft 18 and countershafts 16, 16A are substantially parallel. Additionally, the axis of input shaft 12 is substantially coaxial with the axis of main shaft 18.

In the exemplary transmission shown in FIG. 1, countershafts 16 and 16A carry thereon gears 24, 26, 28, 30, 32 and 24A, 26A, 28A, 30A, 32A, respectively. Gears 42, 44, 46 and 48 encircle main shaft 18 and are constantly engaged with and supported by the countershaft gears 26, 26A, 28, 28A, 30, 30A, 32 and 32A, respectively. Gear 50 is constantly engaged with and supported by a pair of reverse idler gears (not shown), as is well known in the art. Axially slidable clutches 56, 58 and 60 are splined to main shaft 18 for rotation therewith in a known manner. Clutch 56 may be selectively engaged to rotationally fix either input shaft 12 or gear 42 to main shaft 18. Clutch 58 may be selectively engaged to fix gear 44 or gear 46 to main shaft 18. Clutch 60 may be selectively engaged to fix gear 48 or gear 50 to main shaft 18.

In operation, input shaft 12 drives input gear 14 which is constantly engaged with gears 24 and 24A to drive countershafts 16 and 16A and the countershaft gears mounted thereon. The countershaft gears and reverse idler gears are constantly engaged with the main shaft gears and therefore main shaft gears 42, 44, 46, 48 and 50 are constantly rotating whenever input shaft 12 is rotating. The operator of the vehicle may, for example, move sliding clutch 60 to the right to rotationally couple gear 50 to main shaft 18 to achieve a reverse rotation. Similarly, sliding clutch 60 may be moved to the left to couple gear 48 to main shaft 18 for operation in the first forward speed. Similarly, sliding clutch 58 may be utilized to engage gear 46 with main shaft 18 for the second speed or gear 44 with main shaft 18 for the third speed. In a similar manner, clutch 56 may be utilized to engage gear 42 with main shaft 18 for the fourth speed or gear 14 with main shaft 18 for the direct drive or fifth speed.

Figure 2:
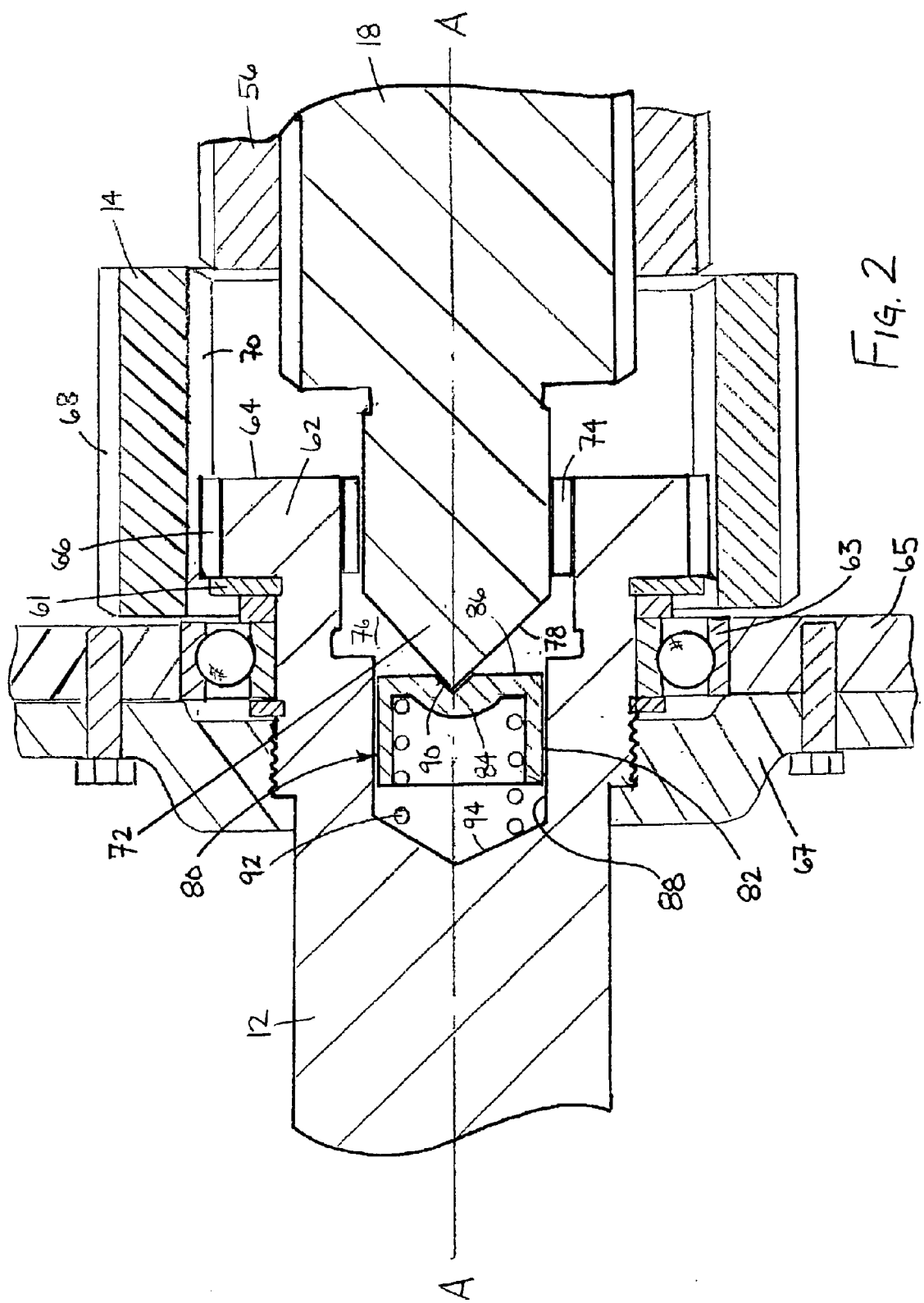
FIG. 2 is an enlarged cross-sectional view of a portion of the transmission of FIG. 1 showing an input shaft, a main shaft and the main shaft centering device of the present invention.

Referring to FIG. 2, the main shaft centering device according to an embodiment of the present invention will be described in detail. Input shaft 12 includes an enlarged splined head 62 on a rearward end 64 thereof. Head 62 includes splines 66, which support annular drive gear 14. Drive gear 14 is retained on head 62 by an annular retaining member 61, such as a snap ring and/or thrust washer for example. Input shaft 12 is rotatably supported by a bearing 63, which is pressed into the space between input shaft 12 and a wall 65 of the transmission housing. A bearing cover 67 is secured to wall 65 and retains bearing 63 and retaining member 61 on input shaft 12. Additional components, such as spacers and other retaining members, may be provided between bearing cover 67 and head 62 depending on the size of the transmission.

Drive gear 14 has external gear teeth 68 that mesh with gears 24, 24A and internal clutch teeth 70 that mesh with clutch 56. Main shaft 18 is aligned coaxially with input shaft 12 along an axis A—A, and is mounted for a limited degree of radial movement and/or floating movement relative to countershafts 16 and 16A.

In the illustrated embodiment, a forward end 72 of main shaft 18 is loosely received within a bushing 74 located in a generally cylindrical recess 76 that extends inwardly from rearward end 64 of input shaft 12. Forward end 72 of main shaft 18 also includes a generally conical tip 78 that extends forward into recess 76 of input shaft 12 beyond bushing 74. A support member 80 is moveably received within recess 76 and engages tip 78 of main shaft 18. In the embodiment illustrated in FIG. 2, support member 80 is generally cup-shaped having a radially outer surface 82, a recessed surface 84 and an engagement surface 86. Outer surface 82 of support member 80 is slightly smaller in diameter than the inner surface 88 of recess 76, which allows support member 80 to move axially within recess 76 with little or no radial movement. Engagement surface 86 of support member 80 includes an indentation 90 that is positioned substantially along axis A—A. Indentation 90 receives tip 78 of main shaft 18, such that main shaft 18 is forced to remain substantially coaxial with input shaft 12. Optionally, support member 80 may be made from or coated with a low friction material to reduce wear between tip 78 and indentation 90.

Support member 80 is biased against main shaft 18 by a resiliently compressible member 92, such as a compression spring. Compressible member 92 is disposed between recessed surface 84 of support member 80 and an axially inner surface 94 of recess 76. Compressible member 92 allows support member 80 and main shaft 18 to move axially within recess 76 of input shaft 12 without support member 80 becoming disengaged from main shaft 18. The continuous engagement of support member 80 with main shaft 18 prevents main shaft 18 from falling off-center when transmission 10 is in neutral.

Figure 3:
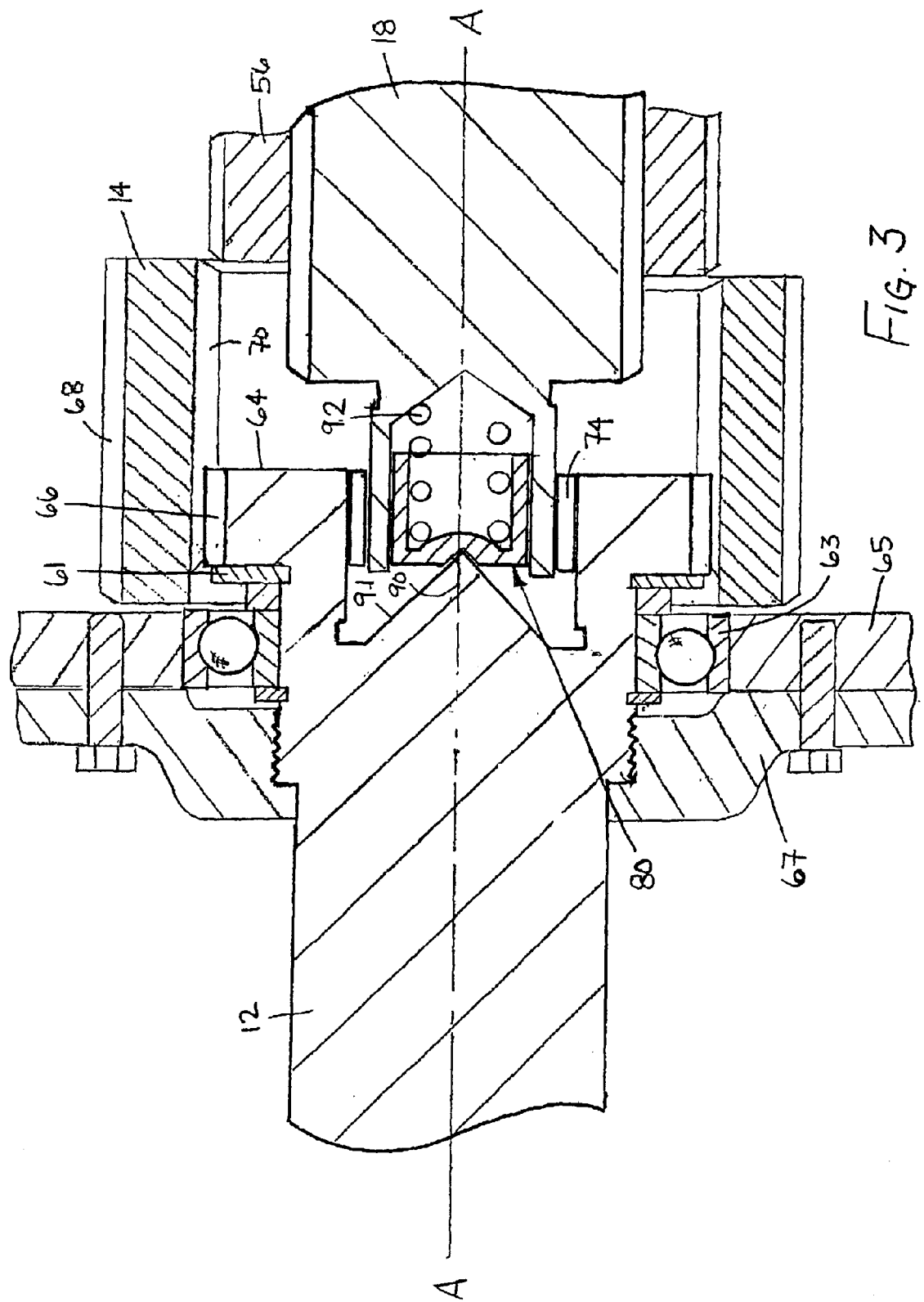
FIG. 3 is an enlarged cross-sectional view of another embodiment of the present invention showing an input shaft, a main shaft and the main shaft centering device of the present invention.

Referring to FIG. 3, another embodiment of the present invention is shown. In this embodiment, support member 80 is received within main shaft 18 instead of input shaft 12. Input shaft 12 includes a conical rearward end 91 that is received within indentation 90 in support member 80. Compressible member 92 allows support member 80 and main shaft 18 to move axially relative to input shaft 12 without support member 80 becoming disengaged from main shaft 18. The continuous engagement of support member 80 with main shaft 18 prevents main shaft 18 from falling off-center when transmission 10 is in neutral.

Figure 4:
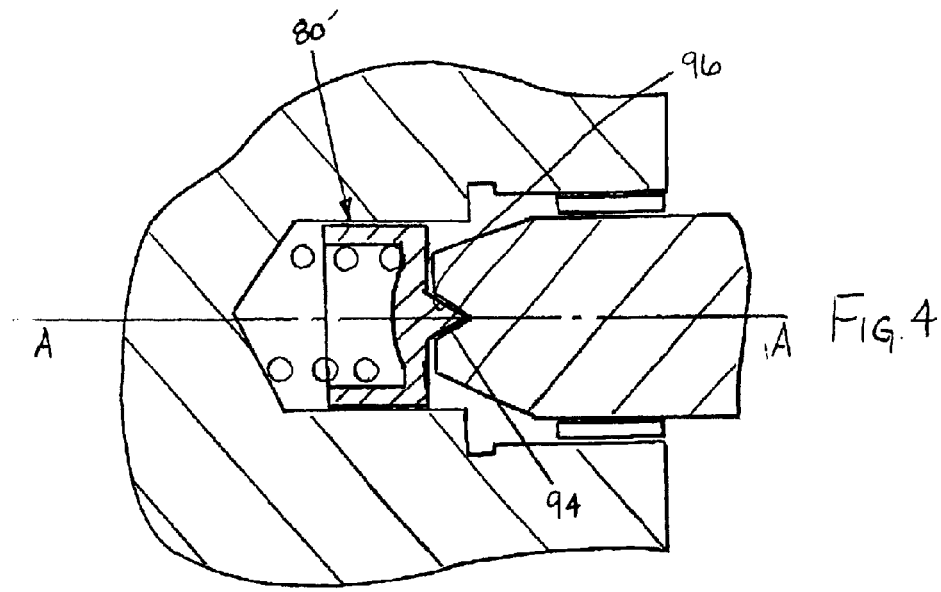
FIG. 4 is cross-sectional view of a main shaft centering device according to another embodiment of the present invention.
Figure 5:
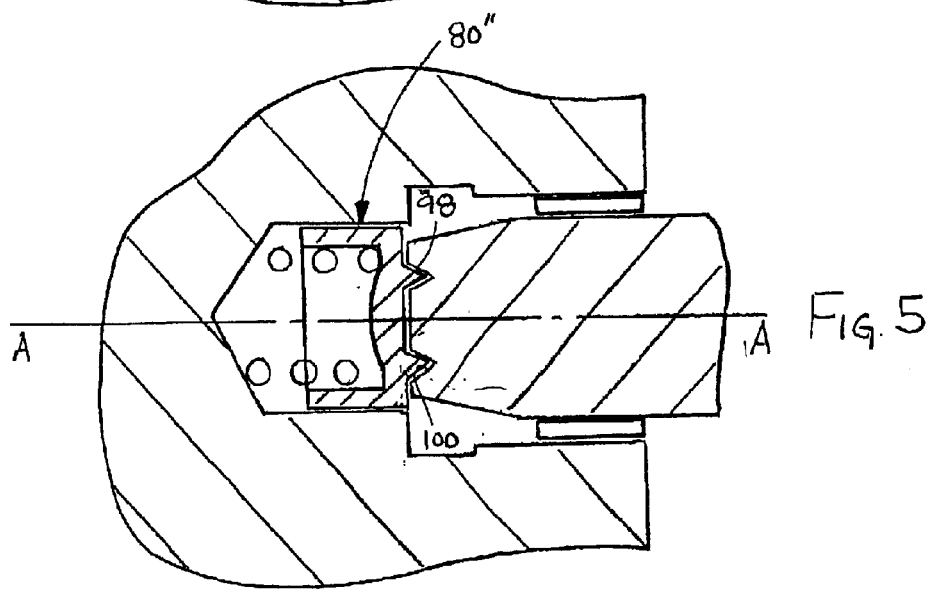
FIG. 5 is cross-sectional view of a main shaft centering device according to another embodiment of the present invention.
Figure 6:
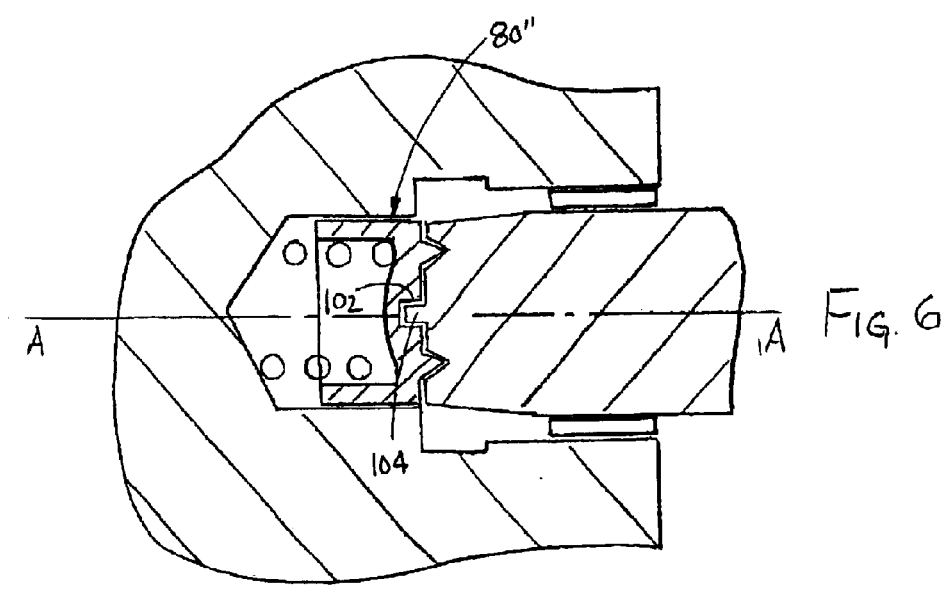
FIG. 6 is cross-sectional view of a main shaft centering device according to another embodiment of the present invention.

While a conical tip 78, 92 and corresponding indentation 90 are shown in FIGS. 2 and 3, other shapes and configurations may be used, so long as the engagement between support member 80 and the mating shaft is maintained. For example, referring to FIGS. 4–6, several other embodiments of the support member and the engaging shaft are shown. In FIG. 4, a support member 80' is provided with a tapered protrusion 94 that extends therefrom into an indentation 96 in the mating shaft. In FIG. 5, a support member 80" is provided with an annular ridge 98 that extends into an annular groove 100 in the mating shaft. In FIG. 6, support member 80'" is provided with a recess 102 that receives a cylindrical protrusion 104 on the mating shaft. It will, however, be appreciated that the shapes and configurations of the support member and the mating shaft depicted in FIGS. 4-6 are not limited thereto, and that other shapes and configurations are within the scope of this invention. Moreover, the male and female components of each engaging component may be associated with either the support member or the mating shaft, as illustrated in FIGS. 3 and 4.

Although certain preferred embodiments of the present invention have been described, the invention is not limited to the illustrations described and shown herein, which are deemed to be merely illustrative of the best modes of carrying out the invention. A person of ordinary skill in the art will realize that certain modifications and variations will come within the teachings of this invention and that such variations and modifications are within its spirit and the scope as defined by the claims.

What is claimed is:

1. A transmission main shaft centering device for use between a transmission input shaft and a transmission main shaft, comprising:

an axially moveable support member having an axis substantially coaxial with an axis of the input shaft, the support member biased into engagement with one of the input shaft and the main shaft to maintain the main shaft substantially coaxial with the input shaft;

wherein the support member includes a first engaging component and one of the input shaft and the main shaft includes a second engaging component, the first and second engaging components mating to maintain the main shaft substantially coaxial with the input shaft; and wherein the first engaging component includes an annular ridge and the second engaging component includes an annular recess.

2. The device of claim 1, wherein the first engaging component further includes a recess and the second engaging component further includes a protrusion.

3. A change gear transmission that includes an input shaft, at least two countershaft assemblies driven by the input shaft, a main shaft driven by the countershafts assemblies, and a main shaft centering device, the main shaft centering device comprising:

an axially moveable support member having and axis substantially coaxial with an axis of the input shaft, the support member biased into engagement with one of the input shaft and the main shaft to maintain the main shaft substantially coaxial with the input shaft;

wherein the support member includes a first engaging component and one of the input shaft and the main shaft includes a second engaging component, the first and second engaging components mating to maintain the main shaft substantially coaxial with the input shaft; and wherein the first engaging component includes an annular ridge and the second engaging component includes an annular recess.

* * * * *

UNITED STATES PATENT AND TRADEMARK OFFICE
CERTIFICATE OF CORRECTION

PATENT NO. : 6,865,964 B2  Page 1 of 1
DATED : March 15, 2005
INVENTOR(S) : Lon C. Miller et al.

It is certified that error appears in the above-identified patent and that said Letters Patent is hereby corrected as shown below:

Column 4,
Line 36, change "or" to -- of --

Signed and Sealed this

Fifth Day of July, 2005

JON W. DUDAS
*Director of the United States Patent and Trademark Office*